US009019828B2

(12) United States Patent
Lam et al.

(10) Patent No.: US 9,019,828 B2
(45) Date of Patent: Apr. 28, 2015

(54) DATA RATE DETERMINATION BASED ON RADIO FREQUENCY DEVICE FEEDBACK

(71) Applicants: Verizon Patent and Licensing, Inc., Basking Ridge, NJ (US); Cellco Partnership, Basking Ridge, NJ (US)

(72) Inventors: Maria G. Lam, Oakland, CA (US); Lalit R. Kotecha, San Ramon, CA (US); Deepak Kakadia, Union City, CA (US); David Chiang, Fremont, CA (US); Jyothi Keshavdas, Pleasanton, CA (US); Arda Aksu, Martinez, CA (US); Sagiv Draznin, Walnut Creek, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 215 days.

(21) Appl. No.: 13/650,614

(22) Filed: Oct. 12, 2012

(65) Prior Publication Data

US 2014/0105035 A1 Apr. 17, 2014

(51) Int. Cl.
*H04J 3/14* (2006.01)
*H04J 3/18* (2006.01)
*H04W 28/02* (2009.01)
*H04W 24/02* (2009.01)

(52) U.S. Cl.
CPC ...... *H04W 28/0273* (2013.01); *H04W 28/0236* (2013.01); *H04W 28/0242* (2013.01); *H04W 24/02* (2013.01)

(58) Field of Classification Search
CPC .................. H04W 28/0273; H04W 28/0236; H04W 28/0231; H04W 28/0242; H04W 28/0247
USPC .......................... 370/230–232, 235, 252, 477
See application file for complete search history.

(56) References Cited

U.S. PATENT DOCUMENTS

| | | | |
|---|---|---|---|
| 7,602,791 B1 * | 10/2009 | Jiang et al. | 370/395.41 |
| 7,801,063 B2 * | 9/2010 | Hiddink et al. | 370/310 |
| 8,218,507 B2 * | 7/2012 | Palmer et al. | 370/333 |
| 8,547,841 B2 * | 10/2013 | Hamdi | 370/231 |
| 8,693,331 B1 * | 4/2014 | Sampath et al. | 370/232 |
| 2002/0105925 A1 * | 8/2002 | Shoemake | 370/330 |
| 2005/0099975 A1 * | 5/2005 | Catreux et al. | 370/329 |
| 2007/0104149 A1 * | 5/2007 | Khan et al. | 370/334 |
| 2008/0159362 A1 * | 7/2008 | Gelbman et al. | 375/219 |
| 2011/0080831 A1 * | 4/2011 | Ludwig et al. | 370/235 |

* cited by examiner

*Primary Examiner* — Redentor Pasia

(57) ABSTRACT

A device may receive information that identifies a radio frequency condition of a user device, where the radio frequency condition indicates a quality of a radio access network connection of the user device. The device may determine a radio frequency parameter value based on the radio frequency condition, and may set a data rate for a transmission control protocol ("TCP") communication with the user device based on the radio frequency parameter value.

20 Claims, 8 Drawing Sheets

| Data Rate 510 | Signal Strength (dBm) 520 | Signal Strength (dBm) Moving Average 530 | SINR (dB) Moving Average 540 | Packet Loss Rate 550 |
|---|---|---|---|---|
| 100 kbps | SS ≤ -70 | SS ≤ -60 | SINR ≤ 0 | PLR ≥ 5% |
| 1 Mbps | -70 < SS ≤ -50 | -60 < SS ≤ -40 | 0 < SINR ≤ 10 | 3% ≤ PLR < 5% |
| 3 Mbps | -50 < SS ≤ -20 | -40 < SS < -30 | 10 < SINR ≤ 15 | 1% ≤ PLR < 3% |
| 10 Mbps | SS > -20 | SS ≥ -30 | SINR > 15 | PLR < 1% |

DATA RATE DETERMINATION BASED ON RADIO FREQUENCY DEVICE FEEDBACK

BACKGROUND

In a network, congestion may occur when a network link or network node is processing too much traffic, causing quality of service to deteriorate. Quality of service deterioration may include packet delay, packet loss, or other network problems that cause an end user to experience degraded service quality.

DETAILED DESCRIPTION OF PREFERRED EMBODIMENTS

The following detailed description of example implementations refers to the accompanying drawings. The same reference numbers in different drawings may identify the same or similar elements.

Communication networks often operate by dividing a communication transmission into packets that can be transmitted to and/or received by devices connected to the network. When a packet is received by a receiver device, the receiver device may send an acknowledgement, to a transmission device that transmitted the packet, acknowledging that the packet was received. The transmission device may implement a congestion control algorithm when the transmission device does not receive the acknowledgement.

The congestion control algorithm (e.g. a transmission control protocol ("TCP") congestion control algorithm and/or a TCP congestion avoidance algorithm) may reduce network congestion by decreasing a data rate (e.g., a rate at which packets are transmitted) between the transmission device and the receiver device. For example, the transmission device may reduce a data rate to the receiver device when the transmission device does not receive an acknowledgement that a packet, transmitted by the transmission device to the receiver device, was received by the receiver device. The transmission device may gradually increase the data rate over time, based on the particular congestion control algorithm implemented by the transmission device.

The transmission device, implementing the congestion control algorithm, may not efficiently adjust a data rate for communications with a receiver device when the congestion control algorithm does not account for receiver device conditions, such as radio frequency ("RF") conditions (e.g., a signal strength of the receiver device). Implementations described herein may permit a transmission device to adjust data rate more efficiently by implementing a congestion control algorithm that determines a data rate for TCP communications with a receiver device based on receiver device RF conditions.

Figure 1:
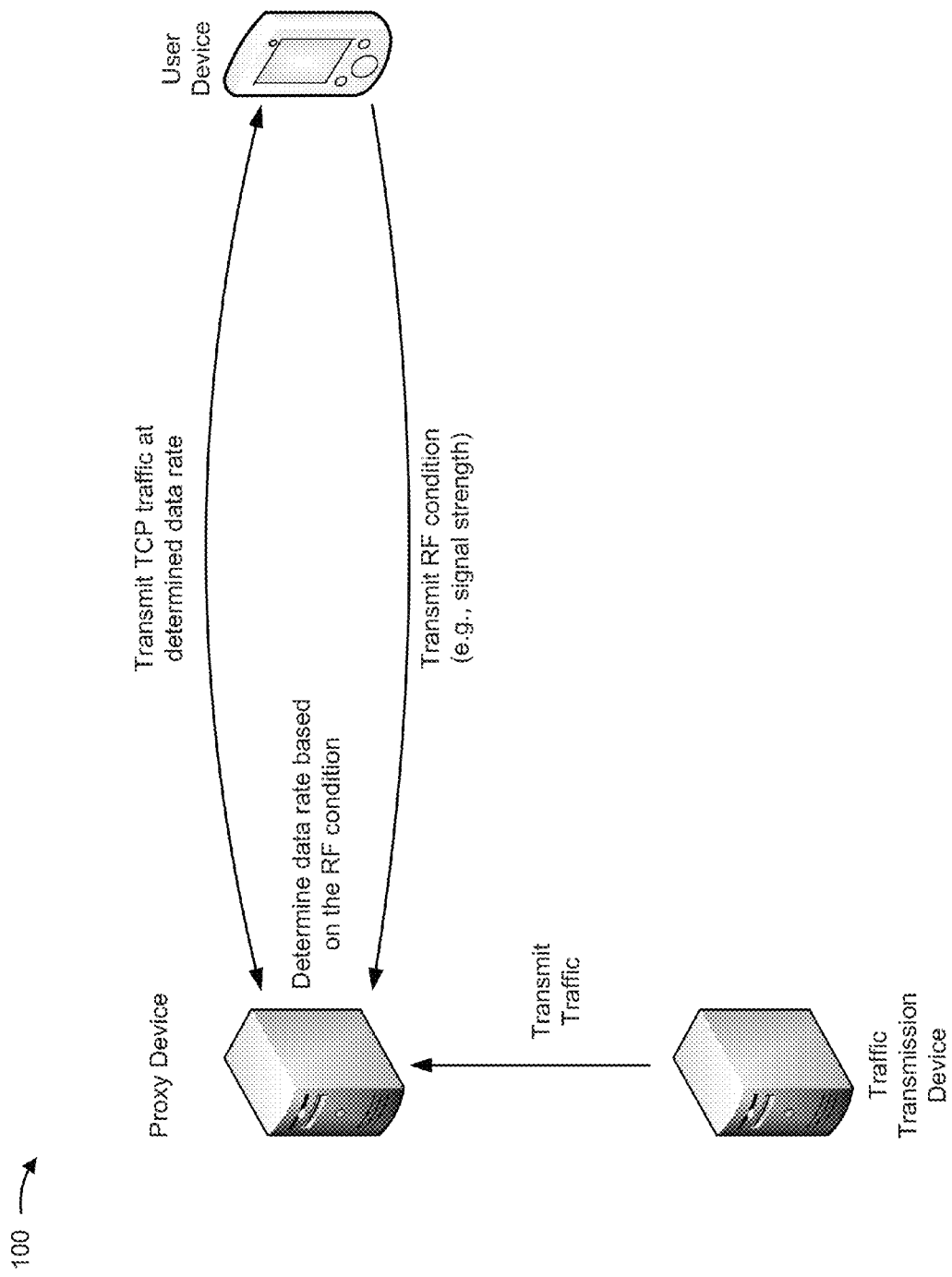
FIG. 1 is a diagram of an overview of an example implementation described herein.

FIG. 1 is a diagram of an overview of an example implementation 100 described herein. As illustrated in FIG. 1, example implementation 100 may include a traffic transmission device, a proxy device, and a user device. For example, the traffic transmission device may be a server, the proxy device may be a server, and the user device may be a mobile phone.

As illustrated in FIG. 1, the traffic transmission device may transmit traffic (e.g., streaming traffic, video traffic, etc.), destined for the user device, to the proxy device. The proxy device may transmit the traffic to the user device at a particular data rate (e.g., a particular quantity of packets transmitted in a particular time period), and may receive traffic from the user device (e.g., packet acknowledgements) transmitted at the particular data rate. The proxy device may adjust the data rate at which traffic is communicated (e.g., via a TCP connection), between the proxy device and the user device, based on an RF condition of the user device. For example, the proxy device may collect the RF condition, and may provide feedback, based on the RF condition, to the traffic transmission device in order to regulate the data rate.

As further illustrated in FIG. 1, the proxy device may determine a data rate for a TCP communication with the user device based on an RF condition of the user device, such as a signal strength of the user device. The user device may determine the RF condition, which may include a signal strength of a wireless connection (such as a radio access network ("RAN") connection, a WiFi connection, a WiMAX connection, etc.) between, for example, the user device and a base station. The user device may transmit information that identifies the RF condition to the proxy device. The proxy device may accumulate the RF condition information over a time period, and may determine a data rate for TCP communications with the user device based on the accumulated RF condition information. For example, the proxy device may decrease the data rate when the signal strength of the user device is low (e.g., below a threshold), as evidenced by the accumulated RF condition information. Similarly, the proxy device may increase the data rate when the signal strength of the user device is high (e.g., above a threshold), as evidenced by the accumulated RF condition information.

Figure 2:
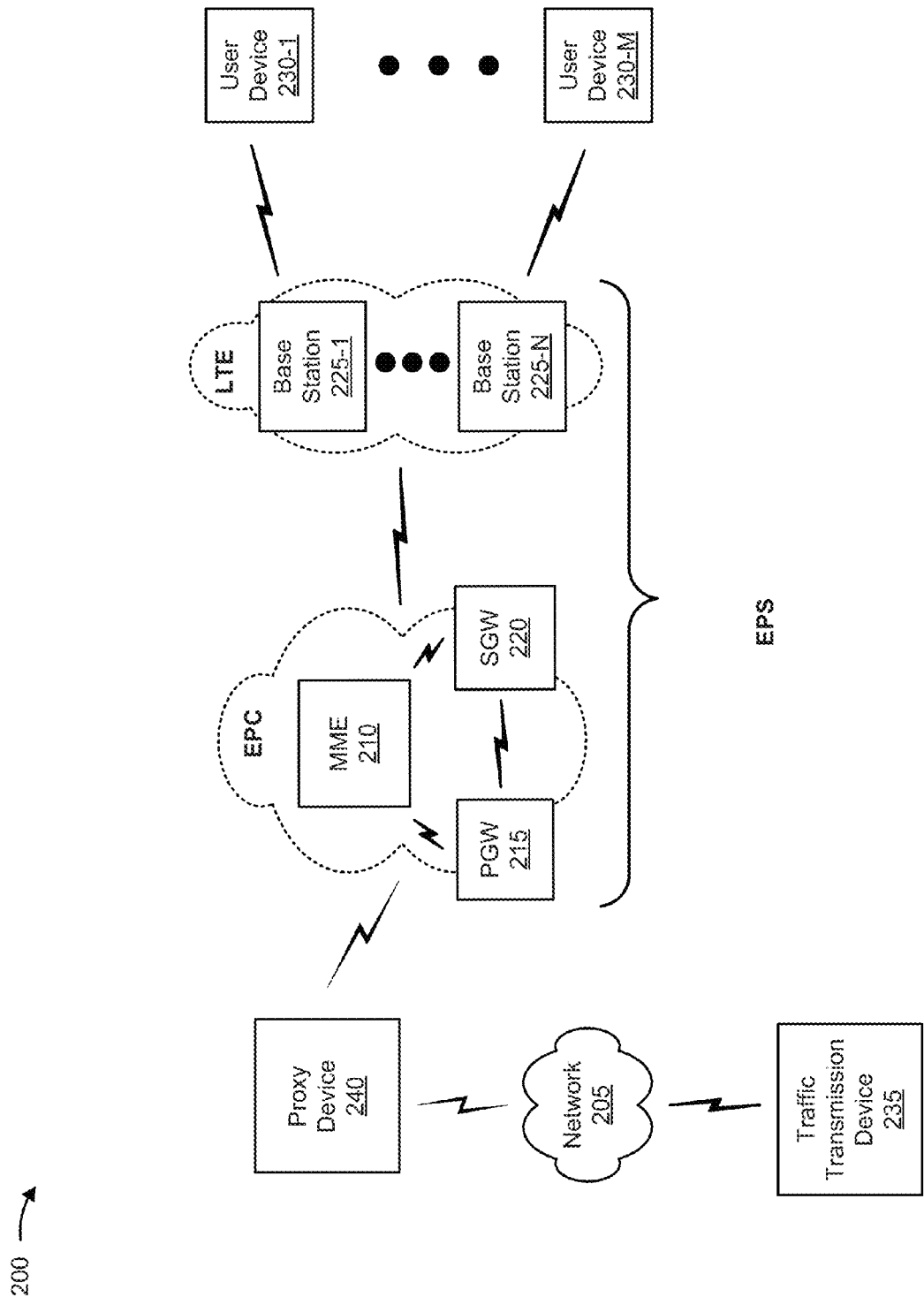
FIG. 2 is a diagram of an example environment in which systems and/or methods described herein may be implemented.

FIG. 2 is a diagram of an example environment 200 in which systems and/or methods described herein may be implemented. As illustrated in FIG. 2, environment 200 may include a network 205, a mobility management entity device 210 (hereinafter referred to as "MME 210"), a packet data network ("PDN") gateway 215 (hereinafter referred to as "PGW 215"), a serving gateway 220 (hereinafter referred to as "SGW 220"), a set of base stations 225-1 through 225-N (N≥1) (hereinafter referred to collectively as "base stations 225," and individually as "base station 225"), a set of user devices 230-1 through 230-M (M≥1) (hereinafter referred to collectively as "user devices 230," and individually as "user device 230"), a traffic transmission device 235, and a proxy device 240.

An implementation is described herein as being performed within a long term evolution ("LTE") network for explanatory purposes. Some implementations may be performed within a network that is not an LTE network, such as a third generation ("3G") network or another type of radio access network. As used herein, the term "radio access network," or "RAN," may include an LTE network, a WiFi connection and/or network, a WiMAX connection and/or network, or another type of radio access network or wireless network.

Environment 200 may include an evolved packet system ("EPS") that includes an LTE network and/or an evolved packet core ("EPC") that operate based on a third generation partnership project ("3GPP") wireless communication standard. The LTE network may be a RAN that includes one or more base stations 225 that may include evolved Node Bs ("eNBs") via which user device 230 communicates with the EPC. The EPC may include MME 210, PGW 215, and/or SGW 220 that enable user device 230 to communicate with network 205 and/or an Internet protocol ("IP") multimedia subsystem ("IMS") core. The IMS core or a third party network (not illustrated) may manage authentication, session initiation, account information, profile information, etc., associated with user device 230.

Network 205 may include one or more wired and/or wireless networks. For example, network 205 may include a cellular network, a public land mobile network ("PLMN"), a second generation ("2G") network, a third generation ("3G") network, a fourth generation ("4G") network, a fifth generation ("5G") network, an LTE network, and/or another network. Additionally, or alternatively, network 205 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

MME 210 may include one or more devices that gather, process, search, store, and/or provide information in a manner described herein. In some implementations, MME 210 may perform operations relating to authentication of user device 230. Additionally, or alternatively, MME 210 may facilitate the selection of a PGW 215 and/or an SGW 220 to forward traffic to and/or from user device 230. MME 210 may perform an operation associated with handing off user device 230 from a first base station 225 to a second base station 225 when user device 230 is transitioning from a cell associated with the first base station 225 to a cell associated with the second base station 225. Additionally, or alternatively, MME 210 may select another MME (not pictured), to which user device 230 should be handed off (e.g., when user device 230 moves out of range of MME 210).

PGW 215 may include one or more devices that gather, process, search, store, and/or provide information in a manner described herein. PGW 215 may include one or more data processing and/or traffic transfer devices, such as a gateway, a router, a modem, a switch, a firewall, a network interface card ("NIC"), a hub, a bridge, a proxy server, an optical add/drop multiplexer ("OADM"), or another type of device that processes and/or transfers traffic. In some implementations, PGW 215 may aggregate traffic received from one or more SGWs 220, and may send the aggregated traffic to network 205. Additionally, or alternatively, PGW 215 may receive traffic from network 205 and may send the traffic to user device 230 via SGW 220.

SGW 220 may include one or more devices that gather, process, search, store, and/or provide information in a manner described herein. SGW 220 may include one or more data processing and/or traffic transfer devices, such as a gateway, a router, a modem, a switch, a firewall, a NIC, a hub, a bridge, a proxy server, an OADM, or any other type of device that processes and/or transfers traffic. In some implementations, SGW 220 may aggregate traffic received from one or more base stations 225 associated with the LTE network, and may send the aggregated traffic to network 205 (e.g., via PGW 215) and/or other network devices associated with the IMS core and/or the EPC. SGW 220 may also receive traffic from network 205 and/or other network devices, and may send the received traffic to user device 230 via base station 225. Additionally, or alternatively, SGW 220 may perform operations associated with handing off user device 230 to and/or from the LTE network.

Base station 225 may include one or more devices that receive, process, and/or transmit traffic, such as audio, video, text, and/or other data, destined for and/or received from user device 230. In some implementations, base station 225 may be include an eNB associated with the LTE network that receives traffic from and/or sends traffic to network 205 via PGW 215 and/or SGW 220. Additionally, or alternatively, one or more base stations 225 may be associated with a RAN that is not associated with the LTE network. Base station 225 may send traffic to and/or receive traffic from user device 230 via an air interface. In some implementations, base station 225 may be associated with a small cell, such as a microcell, a picocell, and/or a femtocell.

User device 230 may include one or more devices, such as one or more wireless communication devices, that are capable of communicating with base station 225 and/or a network (e.g., network 205). For example, user device 230 may include a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a laptop computer, a tablet computer, a personal gaming system, and/or another type of device. User device 230 may send traffic to and/or receive traffic from network 205 (e.g., via base station 225, SGW 220, and/or PGW 215).

Traffic transmission device 235 may include a server device, or another type of device, that gathers, processes, searches, stores, and/or provides information in a manner described herein. In some implementations, traffic transmission device 235 may transmit traffic (e.g., video traffic, internet traffic, etc.), destined for user device 230, to proxy device 240 (e.g., via network 205). Traffic transmission device may include any device that communicates with user device 230.

Proxy device 240 may include a server device, such as a proxy server, and/or another type of device, that gathers, processes, searches, stores, and/or provides information in a manner described herein. In some implementations, proxy device 240 may receive traffic (e.g., TCP traffic), destined for user device 230, from traffic transmission device 235. Proxy device 240 may control the data rate at which TCP traffic is transmitted to and/or received from user device 230 (e.g., via network 205, PGW 215, SGW 220, and/or base station 225). Proxy device 240 may receive information from user device 230, and may control the data rate based on the received information. In some implementations, proxy device 240 may control the data rate for communications other than TCP communications, such as IP communications, real-time transport protocol (RTP) communications, user datagram protocol (UDP) communications, etc. For example, proxy device 240 may control the data rate at a lower layer such as a physical and/or link layer (e.g., at base station 225), and/or at a higher layer such as an IP and/or application layer (e.g., at traffic transmission device 235).

While shown as being located external to the EPS, the EPC, and the LTE, proxy device 240 may be implemented within the EPS, the EPC, and/or the LTE. Additionally, or alternatively, while shown as separate from PGW 215, SGW 220, and base station 225, proxy device 240 may be integrated into (and a part of) PGW 215, SGW 220, and/or base station 225.

The number of devices and networks illustrated in FIG. 2 is provided for explanatory purposes. In practice, there may be additional devices and/or networks, fewer devices and/or networks, different devices and/or networks, or differently arranged devices and/or networks than those illustrated in FIG. 2. Furthermore, two or more of the devices illustrated in FIG. 2 may be implemented within a single device, or a single device illustrated in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
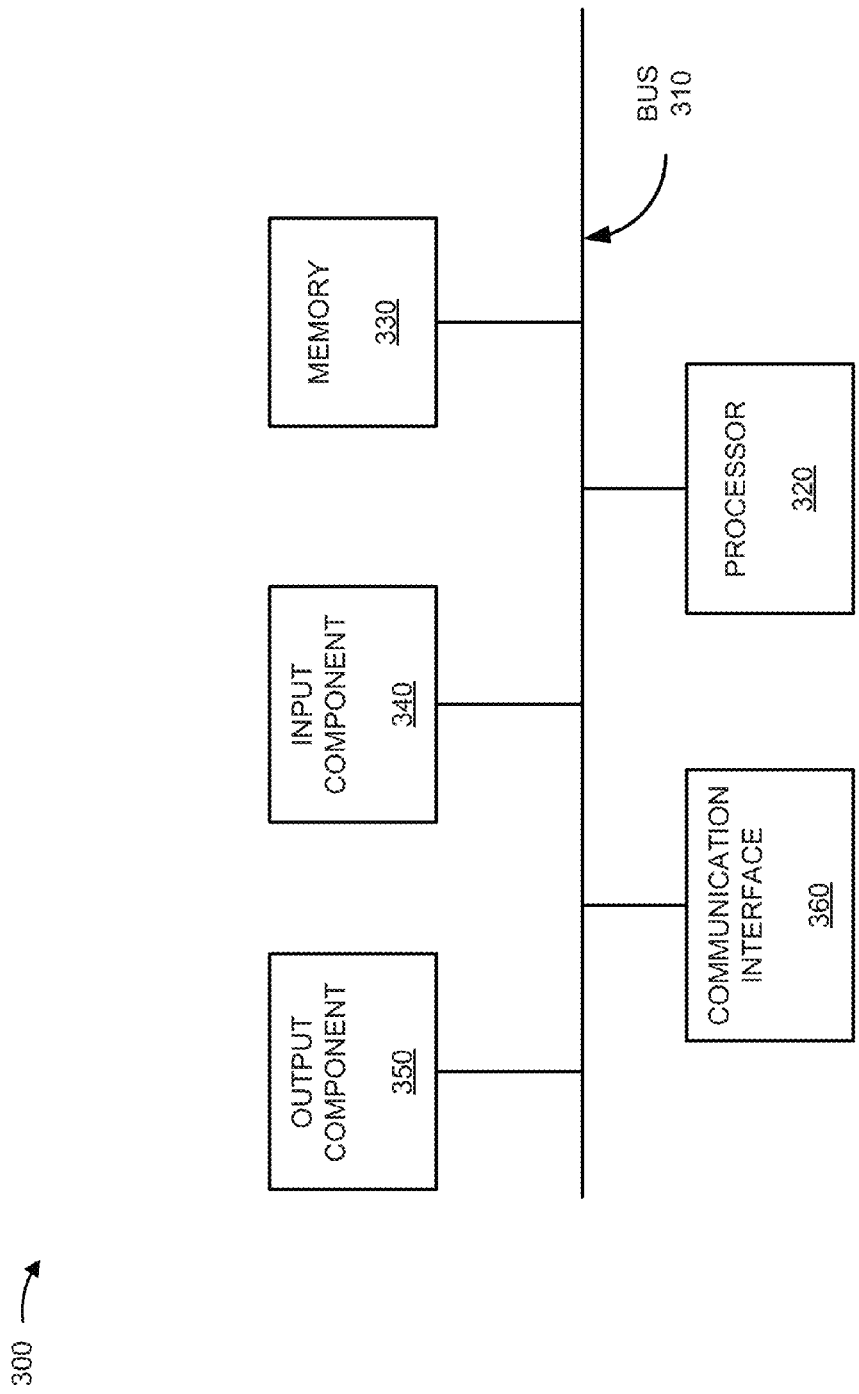
FIG. 3 is a diagram of example components of one or more devices of FIG. 2.

FIG. 3 is a diagram of example components of a device 300. Device 300 may correspond to MME 210, PGW 215, SGW 220, base station 225, user device 230, traffic transmission device 235, and/or proxy device 240. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include a mechanism for communicating with another device and/or system via a network, such as network 205, the EPS, the EPC, the IMS core, and/or the LTE network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3. Additionally, or alternatively, each of MME 210, PGW 215, SGW 220, base station 225, user device 230, traffic transmission device 235, and/or proxy device 240 may include one or more devices 300 and/or one or more components of device 300.

Figure 4:
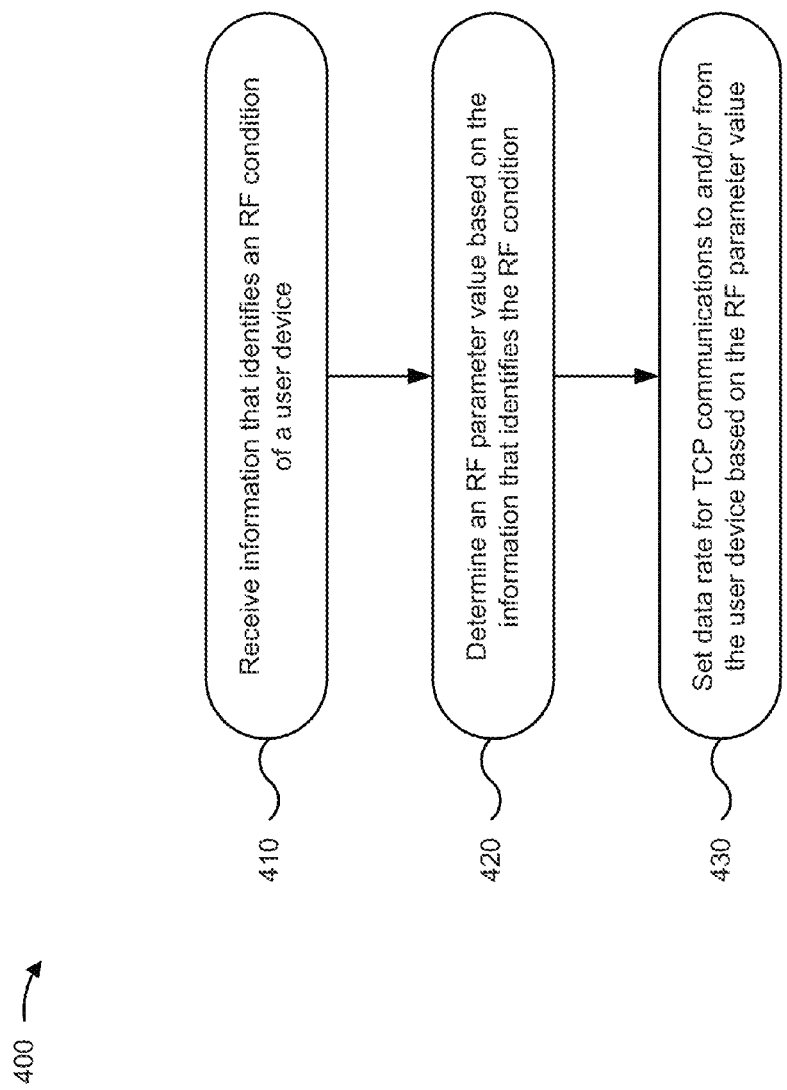
FIG. 4 is a diagram of an example process for setting a data rate of a TCP connection with a user device based on a radio frequency condition of the user device, according to an implementation described herein.

FIG. 4 is a diagram of an example process 400 for setting a data rate of a TCP connection with a user device based on a radio frequency condition of the user device, according to an implementation described herein. In some implementations, one or more process blocks of FIG. 4 may be performed by one or more components of proxy device 240. Additionally, or alternatively, one or more process blocks of FIG. 4 may be performed by one or more components of another device or a collection of devices including or excluding proxy device 240.

As illustrated in FIG. 4, process 400 may include receiving information that identifies an RF condition of a user device (block 410). For example, proxy device 240 may receive the information identifying the RF condition from user device 230. In some implementations, the information identifying the RF condition may include a signal strength of a RAN connection associated with user device 230, such as a signal strength of a connection between user device 230 and base station 225. For example, proxy device 240 may receive, from user device 230, a received signal strength indicator ("RSSI") value, which may include a measurement of an amount of power present in a radio signal received by user device 230.

In some implementations, the information identifying the RF condition may include a signal quality of a RAN communication received and/or transmitted by user device 230. For example, proxy device 240 may receive, from user device 230, a signal-to-interference plus noise ratio ("SINR") value. An SINR value may measure the quality of a RAN connection, and may be calculated as SINR=P/(I+N), where P represents signal power, I represents interference power, and N represents noise power. As another example, proxy device 240 may receive a packet loss rate and/or a packet error rate (e.g., a quantity of packets that fail to reach a particular destination in a particular time period; a percentage of dropped packets compared to a total quantity of transmitted packets, etc.) of a RAN connection of user device 230. As another example, the information identifying the RF condition may include a quality of service class indicator ("QCI") value associated with a RAN communication received and/or transmitted by user device 230.

In some implementations, proxy device 240 may continuously receive the information identifying the RF condition. Alternatively, proxy device 240 may periodically receive the information identifying the RF condition (e.g., once per millisecond, once per second, once per minute, once per hour, etc.). Additionally, or alternatively, proxy device 240 may receive the information identifying the RF condition, from user device 230, in response to an event associated with user device 230. For example, proxy device 240 may request and/or receive the information identifying the RF condition in response to a packet being dropped (e.g., a TCP packet acknowledgement not being received by proxy device 240, from user device 230), a packet loss rate (e.g., for a TCP connection or a RAN connection) satisfying a threshold, a signal strength value satisfying a threshold, an SINR value satisfying a threshold, a QCI value satisfying a threshold, etc.

As further illustrated in FIG. 4, process 400 may include determining an RF parameter value based on the information that identifies the RF condition (block 420). In some implementations, the RF parameter value may be the information that identifies the RF condition, received from user device 230. Additionally, or alternatively, proxy device 240 may receive the information that identifies the RF condition from user device 230, and may determine an RF parameter value based on the information. For example, proxy device 240 may calculate an RF parameter value that indicates an average RF condition, a standard deviation of an RF condition, a moving average of an RF condition, etc. For example, proxy device 240 may calculate an average signal strength value for a particular time period based on a quantity of signal strength values received during the particular time period.

In some implementations, proxy device 240 may calculate a moving average of an RF condition. For example, proxy device 240 may calculate an average of, for example, the five most recently received signal strength values. When a signal strength value is received, proxy device 240 may drop the oldest value (e.g., the sixth most recently received value), and calculate an updated average value using the five most recently received signal strength values.

In some implementations, user device 230 may calculate the RF parameter value, and may transmit the RF parameter value to proxy device 240 (e.g., continuously, periodically, based on a condition, etc.). In some implementations, base station 225 may calculate the RF parameter value, and may transmit the RF parameter value to proxy device 240 (e.g., continuously, periodically, based on a condition, etc.).

As still further illustrated in FIG. 4, process 400 may include setting a data rate for TCP communications to and/or from the user device based on the RF parameter value (block 430). In some implementations, proxy device 240 may determine, based on the RF parameter value, a data rate for communicating with user device 230 (e.g., via a TCP connection). For example, when the RF parameter value satisfies a threshold, proxy device 240 may increase or decrease the data rate for a TCP communication to and/or from user device 230. Additionally, or alternatively, proxy device 240 may set the data rate based on a function that incorporates the RF parameter value. For example, proxy device 240 may set the data rate (e.g., in kbps) to be ten times the RF parameter value. In some implementations, the function may incorporate multiple RF conditions and/or multiple RF parameter values.

In some implementations, proxy device 240 may set the data rate based on a trend of the RF parameter value, associated with user device 230. For example, proxy device 240 may determine that an RF parameter value has increased from time T=1 to time T=2, where time T=2 is later than time T=1. Based on the determination that the RF parameter value has increased over time, proxy device 240 may increase the data rate for TCP communications between proxy device 240 and user device 230. Similarly, proxy device 240 may decrease the data rate for TCP communications with user device 230 based on a determination that an RF parameter value has decreased over time. In some implementations, proxy device 240 may buffer content, such as content received from traffic transmission device 235, when proxy device 240 decreases the data rate for TCP communications with user device 230.

In some implementations, the RF condition and/or the RF parameter value may measure a characteristic of a first layer (e.g., a physical layer, a link layer, etc.) of a protocol stack (e.g., the Internet protocol suite, the Open Systems Interconnection model, etc.), and proxy device 240 may set a data rate for transmissions associated with a second layer (e.g., a network layer, a transport layer, a session layer, a presentation layer, an application layer, etc.) of the protocol stack. For example, the RF condition and/or the RF parameter value may measure a value associated with a physical layer, such as a signal strength associated with a radio access network, and proxy device 240 may set a data rate for communicating over a transport layer (e.g., via TCP). In some implementations, proxy device 240 may set the data rate for a communication that uses a transmission control protocol ("TCP") and/or an Internet protocol ("IP") to communicate with user device 230. For example, proxy device 240 may determine a socket on user device 230 that serves as a connection point for a communication (e.g., a communication with proxy device 240), and may set the data rate of communications destined for and/or transmitted at the determined socket.

While a series of blocks has been described with regard to FIG. 4, the order of the blocks may be modified in some implementations. Additionally, or alternatively, non-dependent blocks may be performed in parallel.

Figure 5:
FIG. 5 is a diagram of an example data structure that stores thresholds that may trigger data rate determination.

FIG. 5 is a diagram of an example data structure 500 that stores thresholds that may trigger data rate determination. Data structure 500 may be stored in a memory device (e.g., a RAM, a hard disk, etc.), associated with one or more devices and/or components shown in FIGS. 2 and 3. For example, data structure 500 may be stored by proxy device 240.

Data structure 500 may include a collection of fields, such as a data rate field 510, a signal strength field 520, a signal strength moving average field 530, a SINR moving average field 540, and a packet loss rate field 550.

Data rate field 510 may store information that identifies a data rate value for a connection (e.g., a TCP connection) between user device 230 and proxy device 240. In some implementations, the data rate value may be expressed as a quantity of bits that are conveyed and/or processed per unit of time (e.g., bits per second ("bps"), kilobits per second ("kbps"), megabits per second ("Mbps"), gigabits per second ("Gbps"), etc.). Proxy device 240 may set the data rate value for TCP communications between user device 230 and proxy device 240 using the data rate value stored in data rate field 510, and based on an RF parameter value satisfying a threshold stored in fields 520-550.

Signal strength field 520 may store information that identifies a signal strength threshold that may cause proxy device 240 to apply a data rate stored in data rate field 510 to a TCP communication between proxy device 240 and user device 230. For example, when a signal strength (e.g., expressed in decibels per milliwatt ("dBm")) of user device 230 is less than or equal to −70 dBm, proxy device 240 may set the data rate to 100 kbps, as illustrated.

Signal strength moving average field 530 may store information that identifies an average signal strength threshold that may cause proxy device 240 to apply a data rate stored in data rate field 510 to a TCP communication between proxy device 240 and user device 230. For example, when an average signal strength (e.g., expressed in dBm) of user device 230 is greater than −60 dBm, and less than or equal to −40 dBm, proxy device 240 may set the data rate to 1 Mbps, as illustrated.

SINR moving average field 540 may store information that identifies an average SINR value threshold that may cause proxy device 240 to apply a data rate stored in data rate field 510 to a TCP communication between proxy device 240 and user device 230. For example, when an average SINR value (e.g., expressed in dB) of user device 230 is greater than 15 dB, proxy device 240 may set the data rate to 10 Mbps, as illustrated.

In some implementations, the average signal strength and/or SINR value may be measured over a particular time period (e.g., a second, a minute, an hour, etc.). In some implementations, the average signal strength and/or SINR value may be measured based on a quantity of received signal strength and/or SINR value parameters (e.g., an average of ten received parameters; an average of five most recently received parameters). Additionally, or alternatively, the average signal strength and/or SINR value may be a moving average, which may be updated periodically (e.g., an average parameter value over the past minute, updated every minute; an average parameter value over the past thirty seconds, updated every second; an average parameter value of the ten most recently received parameter values; etc.).

Packet loss rate field 550 may store information that identifies a packet loss rate threshold that may cause proxy device 240 to apply a data rate stored in data rate field 510 to a TCP communication between proxy device 240 and user device 230. For example, when a packet loss rate (e.g., expressed as a percentage of packets lost based on the total quantity of packets sent, expressed as a quantity of packets lost per time period, etc.) of user device 230 is less than 1%, proxy device 240 may set the data rate to 10 Mbps, as illustrated. The packet loss rate may be associated with a TCP connection, a RAN connection, or another connection of user device 260.

Information associated with a single data rate may be conceptually represented as a row in data structure 500. For example, the first row in data structure 500 may correspond to a data rate of "100 kbps." Proxy device 240 may set the data rate of a TCP communication between proxy device 240 and user device 230 to 100 kbps when one, a combination of, or all of the thresholds set forth in the first row of data structure 500 are satisfied. For example, proxy device 240 may set the data rate to 100 kbps when a signal strength ("SS") of user device 230 is less than or equal to "−70 dBm." Additionally, or alternatively, proxy device 240 may set the data rate to 100 kbps when an average signal strength (e.g., a moving average) of user device 230 is less than or equal to "−60 dBm." Additionally, or alternatively, proxy device 240 may set the data rate to 100 kbps when an average SINR value (e.g., a moving average) of user device 230 is less than or equal to "0 dB." Additionally, or alternatively, proxy device 240 may set the data rate to 100 kbps when a packet loss rate (e.g., a packet loss rate over a particular time period) of user device 230 is greater than or equal to "5%."

In some implementations, proxy device 240 may use a single RF parameter value to determine a data rate value to apply to a TCP communication between proxy device 240 and user device 230. In other implementations, proxy device 240 may set a data rate based on a combination of RF parameter values. In yet other implementations, proxy device 240 may calculate a score based on multiple RF parameter values, and may set a data rate based on the score satisfying a threshold. Additionally, or alternatively, proxy device 240 may weigh the RF parameter values when determining the score. For example, proxy device 240 may weigh signal strength more heavily than SINR value.

Data structure 500 includes fields 510-550 for explanatory purposes. In practice, data structure 500 may include additional fields, fewer fields, different fields, or differently arranged fields than those illustrated in FIG. 5 and/or described herein with respect to data structure 500. Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or component. Additionally, or alternatively, data structure 500 may include information provided from another source, such as information provided by a user, and/or information automatically provided by a device.

Figure 6A:
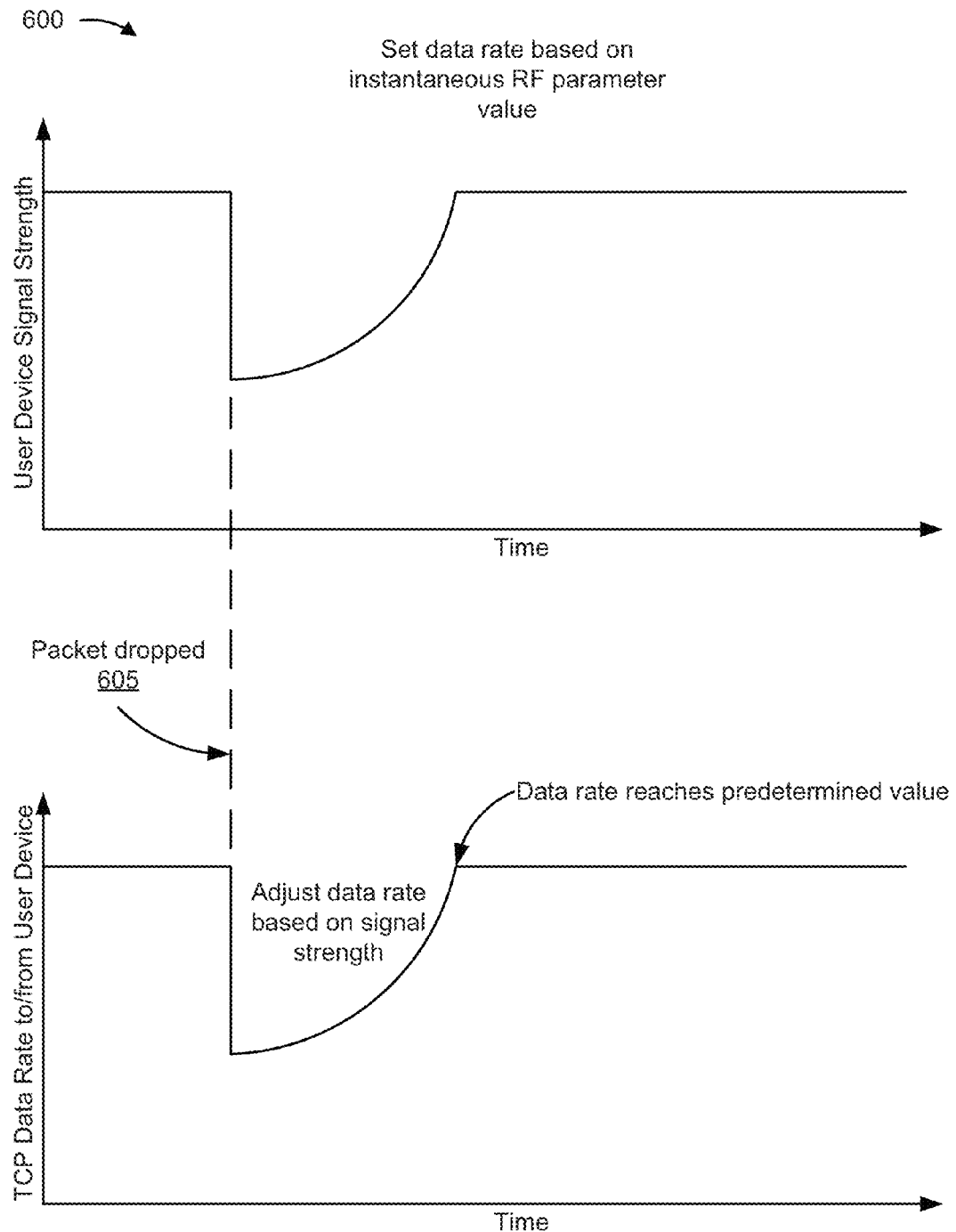
FIGS. 6A-6C are diagrams of example implementations described herein.
Figure 6B:
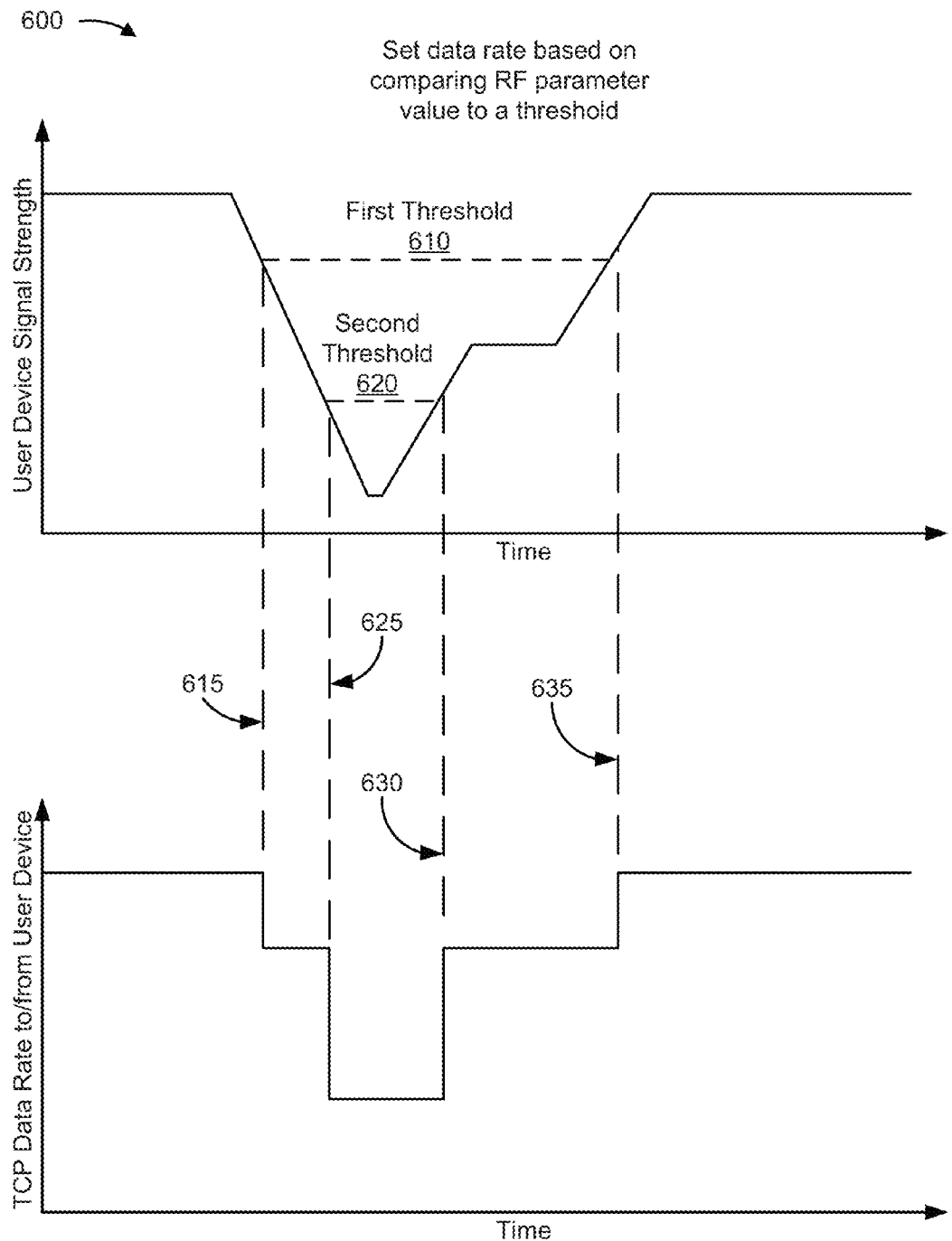
Figure 6C:
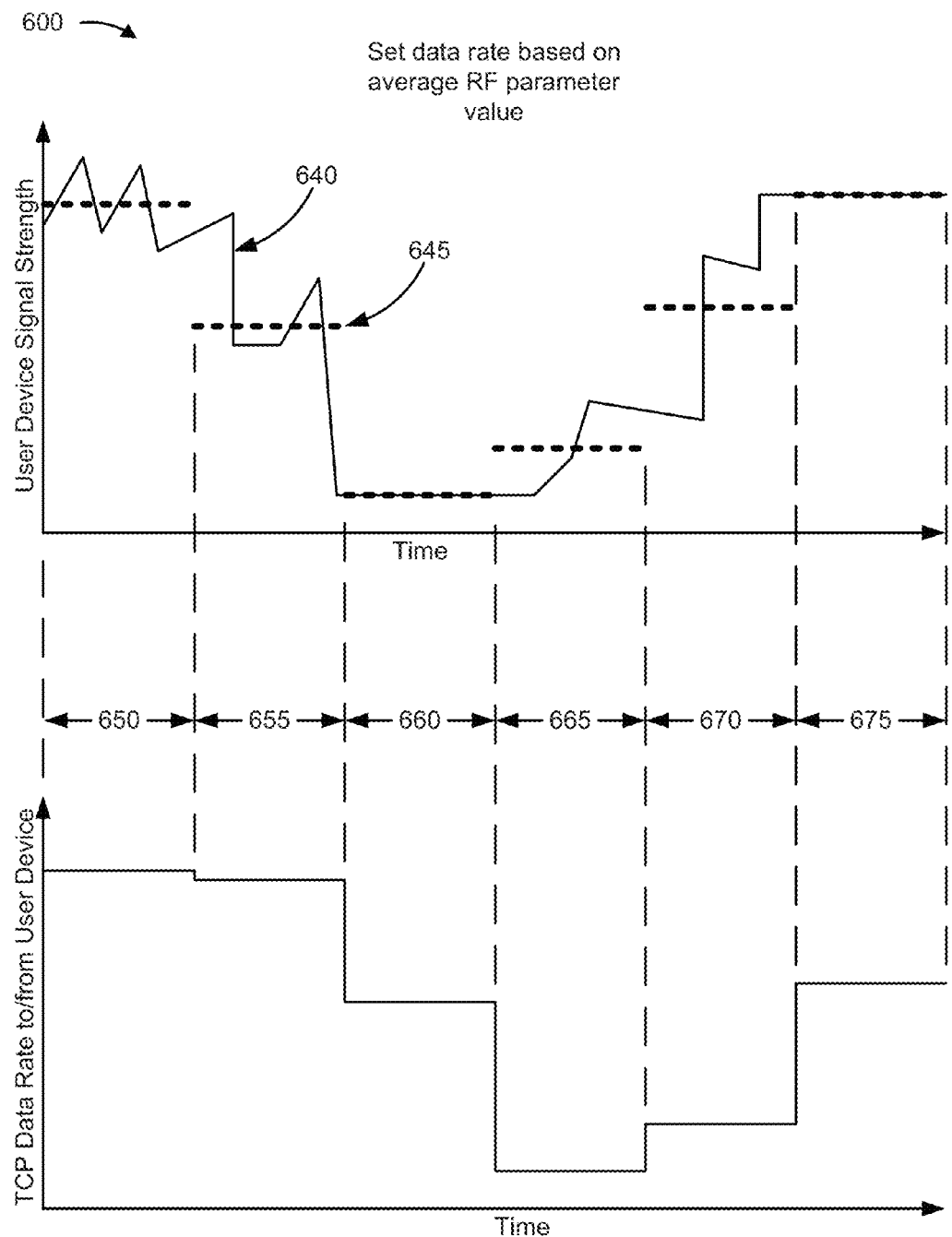

FIGS. 6A-6C are diagrams of example implementations 600 described herein. FIGS. 6A-6C illustrate example implementations where proxy device 240 sets a data rate for TCP communications between proxy device 240 and user device 230 based on an RF parameter value associated with user device 230.

FIG. 6A illustrates an example implementation where proxy device 240 sets a data rate, for a TCP communication between proxy device 240 and user device 230, based on an instantaneous RF parameter value.

As illustrated in FIG. 6A, at time 605, proxy device 240 may determine that a packet, carrying information via a TCP connection between proxy device 240 and user device 230, has been dropped. Based on determining that the packet has been dropped, proxy device 240 may receive information that identifies an RF condition and/or may determine an RF parameter value. For example, proxy device 240 may receive a signal strength of user device 230 and may set a data rate at which information is communicated via the TCP connection based on the signal strength. In some implementations, proxy device 240 may continuously monitor the signal strength of user device 230. In other implementations, proxy device 240 may monitor the signal strength of user device 230 after a packet (e.g., a packet carried over the TCP connection) has been dropped. Additionally, or alternatively, proxy device 240 may monitor the signal strength of user device 230 based on the data rate satisfying a threshold. For example, proxy device 240 may only monitor the signal strength of user device 230 when the current data rate being used to communicate with user device 230 is below a certain threshold.

As further illustrated in FIG. 6A, proxy device 240 may continuously (or periodically) monitor the signal strength of user device 230 after the packet has been dropped, and may adjust the data rate based on the signal strength. Once the data rate reaches a predetermined value, proxy device 240 may stop monitoring the signal strength of user device 230.

FIG. 6B illustrates an example implementation where proxy device 240 sets a data rate, for a TCP communication between proxy device 240 and user device 230, based comparing an RF parameter value to a threshold.

As illustrated in FIG. 6B, proxy device 240 may continuously (or periodically) monitor an RF condition and/or may periodically determine an RF parameter value, such as a signal strength of user device 230, and may adjust the data rate of a TCP connection between proxy device 240 and user device 230 based on the signal strength satisfying a threshold. Additionally, or alternatively, user device 230 may transmit a signal strength to proxy device 240 when the signal strength satisfies a threshold.

As illustrated in FIG. 6B, proxy device 240 may determine that a signal strength of user device 230 is less than a first threshold 610 at time 615, and may decrease the data rate for TCP communications between user device 230 and proxy device 240. In some implementations, proxy device 240 may set the data rate value to a predetermined value based on first threshold 610.

Similarly, proxy device 240 may determine that a signal strength of user device 230 is less than a second threshold 620 at time 625, and may decrease the data rate for TCP communications between user device 230 and proxy device 240. In some implementations, proxy device 240 may set the data rate value to a predetermined value based on second threshold 620.

As further illustrated in FIG. 6B, proxy device 240 may determine that a signal strength of user device 230 is greater than second threshold 620 at time 630, and may increase the data rate for TCP communications between user device 230 and proxy device 240. In some implementations, proxy device 240 may set the data rate value to a predetermined value based on second threshold 620.

Similarly, proxy device 240 may determine that a signal strength of user device 230 is greater than first threshold 610 at time 635, and may increase the data rate for TCP communications between user device 230 and proxy device 240. In some implementations, proxy device 240 may set the data rate value to a predetermined value based on first threshold 610.

FIG. 6C illustrates an example implementation where proxy device 240 sets a data rate, for a TCP communication between proxy device 240 and user device 230, based on an average RF parameter value.

As illustrated in FIG. 6C, proxy device 240 may continuously (or periodically) monitor an RF condition and/or may periodically determine an RF parameter value, such as an average signal strength of user device 230, and may adjust the data rate of a TCP connection between proxy device 240 and user device 230 based on the average signal strength. In some implementations, proxy device 240 may set the data rate based on the average signal strength satisfying a threshold. In some implementations, proxy device 240 may set the data rate to a predetermined value based on the average signal strength satisfying a threshold. Additionally, or alternatively, proxy device 240 may adjust the data rate based on a function that includes the signal strength (e.g., so that the data rate is proportional to the signal strength of user device 230).

In FIG. 6C, the thin solid line represents instantaneous signal strength 640, while the thick dotted line represents average signal strength 645 in a particular time period. Proxy device 240 may determine average signal strength 645 for a particular time period, and may adjust a data rate of a TCP communication for a succeeding time period (e.g., which may be of equal length) based on the average signal strength 645. For example, proxy device 240 may determine a data rate in time period 655 based on an average signal strength in time period 650. Similarly, proxy device 240 may determine a data rate for time periods 660, 665, 670, and 675 based on an average signal strength in time periods 655, 660, 665, and 670, respectively.

In some implementations, proxy device 240 may set a data rate of the TCP communication for a time period based on an average signal strength in multiple preceding time periods. For example, proxy device 240 may determine an average of the average signal strength in time period 655 and the average signal strength in time period 660 in order to set the data rate in time period 665. In some implementations, each of time periods 650-675 may be equivalent in length. In other implementations, one or more times periods 650-675 may have different lengths.

In some implementations, proxy device 240 may set a data rate of the TCP communication based on a trend associated with the signal strength. For example, proxy device 240 may determine that the average signal strength increased from time period 660 to time period 665, and may infer that the average signal strength will continue to rise to the value shown in time period 670. Proxy device 240 may use the inference to set the data rate. For example, the data rate in time period 670 may be set to the data rate shown in time period 675 based on the inference.

In the example implementations illustrated in FIGS. 6A-6C, signal strength is described as the RF parameter value used by proxy device 240 to determine a data rate. In practice, proxy device 240 may use additional RF parameters values and/or different RF parameter values when determining a data rate to use for TCP communications between proxy device 240 and user device 230.

Implementations described herein may permit a network device to adjust data rate of a TCP connection more efficiently by implementing a congestion control algorithm that determines a data rate for TCP communications with a user device based on a user device RF condition.

The foregoing disclosure provides illustration and description, but is not intended to be exhaustive or to limit the embodiments to the precise form disclosed. Modifications and variations are possible in light of the above disclosure or may be acquired from practice of the embodiments.

While implementations are described herein with respect to TCP communications, in some implementations, proxy device 240 may control the data rate for communications other than TCP communications, such as IP communications, real-time transport protocol (RTP) communications, user datagram protocol (UDP) communications, etc. For example, proxy device 240 may control the data rate at a lower layer such as a physical and/or link layer (e.g., at base station 225), and/or at a higher layer such as an IP and/or application layer (e.g., at traffic transmission device 235).

As used herein, the term "component" is intended to be broadly construed as hardware, firmware, or a combination of hardware and software.

The term "packet," as used herein, may refer to a packet, a datagram, a cell, a fragment of a packet, a fragment of a datagram, a fragment of a cell, or any other type or arrangement of data that may be carried at a specified communication layer.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
   detect an event, associated with a transmission control protocol (TCP) communication of a user device, the event including at least one of:
   an indication that a packet, associated with the TCP communication, has been dropped, or
   an indication that a data rate, associated with the TCP communication, is less than or equal to a threshold;
   determine, based on detecting the event, a radio frequency parameter value associated with the user device,
   the radio frequency parameter value indicating a quality of a radio access network connection associated with the user device;
   compare the radio frequency parameter value to a first threshold value;
   determine that the radio frequency parameter value does not satisfy the first threshold value;
   compare the radio frequency parameter value to a second threshold value based on determining that the radio frequency parameter value does not satisfy the first threshold value,
   the second threshold value being different from the first threshold value; and
   set the data rate for the TCP communication, associated with the user device, based on comparing the radio frequency parameter value to the second threshold value.

2. The device of claim 1, where the radio frequency parameter value represents at least one of:
   a signal strength of the radio access network connection; or
   a signal quality of the radio access network connection.

3. The device of claim 1, where the radio frequency parameter value comprises at least one of:
   an average of a plurality of radio frequency parameter values associated with the radio access network connection; or
   a standard deviation of a plurality of radio frequency parameter values associated with the radio access network connection.

4. The device of claim 1, where the radio frequency parameter value comprises an average of a plurality of radio frequency parameter values measured during a first time period; and
   where the one or more processors, when setting the data rate, are further to:
   set the data rate, during a second time period, based on the average,
   where the first time period and the second time period are different.

5. The device of claim 1, where the one or more processors are further to:
   determine a plurality of radio frequency parameter values associated with the user device,
   the plurality of radio frequency parameter values including the radio frequency parameter value;
   infer a trend associated with the plurality of radio frequency parameter values,
   the trend indicating at least one of:
   an increase in the radio frequency parameter value over time, or
   a decrease in the radio frequency parameter value over time; and
   where the one or more processors, when setting the data rate, are further to:
   set the data rate based on inferring the trend.

6. The device of claim 1, where the one or more processors are further to:
   determine a connection point of the user device, the connection point being associated with the TCP communication; and
   where the one or more processors, when setting the data rate, are further to:
   set the data rate for the TCP communication associated with the connection point.

7. The device of claim 1, where the radio frequency parameter value measures a characteristic of a first layer of a protocol stack; and
   where the one or more processors, when setting the data rate, are further to:
   set the data rate for the TCP communication transmitted via a second layer of the protocol stack,
   where the first layer and the second layer are different.

8. The device of claim 1, where the one or more processors, when detecting the event, are further to:
   determine that the packet, associated with the TCP communication, has been dropped; and
   where the one or more processors, when determining the radio frequency parameter value, are further to:
   determine the radio frequency parameter value based on determining that the packet, associated with the TCP communication, has been dropped.

9. The device of claim 1, where the one or more processors, when detecting the event, are further to:
   determine that the data rate, associated with the TCP communication, is less than or equal to the threshold; and
   where the one or more processors, when determining the radio frequency parameter value, are further to:
   determine the radio frequency parameter value based on determining that the data rate, associated with the TCP communication, is less than or equal to the threshold.

10. The device of claim 1, where the device is a proxy device positioned between a base station, that serves the user device, and a traffic transmission device communicating with the user device via the TCP communication.

11. A method, comprising:
    detecting, by a device, that a packet, of a transmission control protocol (TCP) communication associated with a user device, has been dropped;
    determining, by the device and based on detecting that the packet has been dropped, a radio frequency parameter value associated with a connection between the user device and a base station,
    the radio frequency parameter value representing at least one of:
    a signal strength associated with the connection between the user device and the base station, or a signal quality associated with the connection between the user device and the base station;
comparing, by the device, the radio frequency parameter value and a first threshold value;
determining, by the device, that the radio frequency parameter value does not satisfy the first threshold value;
comparing, by the device, the radio frequency parameter value and a second threshold value based on determining that the radio frequency parameter value does not satisfy the first threshold value,
the second threshold value being different from the first threshold value; and
setting, by the device, a data rate for the TCP communication, associated with the user device, based on comparing the radio frequency parameter value and the second threshold value.

12. The method of claim 11, where determining the radio frequency parameter value further comprises:
determining a standard deviation of a plurality of radio frequency parameter values associated with the connection between the user device and the base station.

13. The method of claim 11, where setting the data rate further comprises:
setting the data rate based on a function that incorporates the radio frequency parameter value.

14. The method of claim 11, where the radio frequency parameter value comprises an average of a plurality of radio frequency parameter values measured during a first time period; and
where setting the data rate further comprises:
setting the data rate, during a second time period, based on the average,
where the first time period and the second time period are different.

15. The method of claim 11, further comprising:
comparing the radio frequency parameter value and another radio frequency parameter value associated with the connection between the user device and the base station;
determining a trend, associated with the user device, based on comparing the radio frequency parameter value and the other radio frequency parameter value; and
where setting the data rate further comprises:
setting the data rate based on the trend.

16. The method of claim 11, where the radio frequency parameter value measures a characteristic of a first layer of a protocol stack; and
where setting the data rate further comprises:
setting the data rate for the TCP communication transmitted via a second layer of the protocol stack,
where the first layer and the second layer are different.

17. A non-transitory computer-readable medium storing instructions, the instructions comprising:
one or more instructions that, when executed by one or more processors, cause the one or more processors to:
determine that a data rate, of a transmission control protocol (TCP) communication associated with a user device, is less than or equal to a threshold;
determine, based on determining that the data rate is less than or equal to the threshold, a radio frequency parameter value associated with the user device,
the radio frequency parameter value measuring at least one of:
a signal strength of a connection between the user device and a base station, or
a signal quality of the connection between the user device and the base station;
compare the radio frequency parameter value to a first threshold value;
determine that the radio frequency parameter value does not satisfy the first threshold value;
compare the radio frequency parameter value to a second threshold value based on determining that the radio frequency parameter value does not satisfy the first threshold value,
the second threshold value being different from the first threshold value; and
set the data rate for the TCP communication, associated with the user device, based on comparing the radio frequency parameter value to the second threshold value.

18. The non-transitory computer-readable medium of claim 17, where:
the radio frequency parameter value is associated with a first layer that includes at least one of a physical layer or a link layer;
the TCP communication is associated with a second layer that includes at least one of a link layer, a network layer, a transport layer, a session layer, a presentation layer, or an application layer; and
the first layer and the second layer are different.

19. The non-transitory computer-readable medium of claim 17, where the one or more instructions, when executed by the one or more processors, further cause the one or more processors to:
infer a trend based on the radio frequency parameter value and another radio frequency parameter value; and
where the one or more instructions, that cause the one or more processors to set the data rate for the communication, further cause the one or more processors to:
set the data rate based on inferring the trend.

20. The non-transitory computer-readable medium of claim 17, where the one or more instructions, when executed by the one or more processors, further cause the one or more processors to:
infer a trend based on the radio frequency parameter value and another radio frequency parameter value associated with the user device,
the trend indicating that the radio frequency parameter value will be higher in a future time period, or
the trend indicating that the radio frequency parameter value will be lower in the future time period; and
where the one or more instructions, that cause the one or more processors to set the data rate for the communication, further cause the one or more processors to:
set the data rate based on inferring the trend.

* * * * *